(12) United States Patent
Finch et al.

(10) Patent No.: US 7,688,256 B2
(45) Date of Patent: Mar. 30, 2010

(54) VELOCITY EXTRACTION

(75) Inventors: Derek Geoffrey Finch, Cowes (GB); Anthony Michael Deakin, Rowlands Castle (GB)

(73) Assignee: BAE Systems PLC, London (GB)

( * ) Notice: Subject to any disclaimer, the term of this patent is extended or adjusted under 35 U.S.C. 154(b) by 216 days.

(21) Appl. No.: 10/541,906

(22) PCT Filed: Jun. 21, 2005

(86) PCT No.: PCT/GB2005/050094

§ 371 (c)(1), (2), (4) Date: Jul. 12, 2005

(87) PCT Pub. No.: WO2006/000835

PCT Pub. Date: Jan. 5, 2006

(65) Prior Publication Data

US 2007/0013580 A1    Jan. 18, 2007

(30) Foreign Application Priority Data

Jun. 24, 2004  (EP) .................................. 04253789
Jun. 24, 2004  (GB) .................................. 0414208.9

(51) Int. Cl.
    *G01S 13/58* (2006.01)
(52) U.S. Cl. ..................... 342/160; 342/104; 342/194
(58) Field of Classification Search .............. 342/157.2, 342/194, 159–164
    See application file for complete search history.

(56) References Cited

U.S. PATENT DOCUMENTS

| 3,706,989 | A | * | 12/1972 | Taylor, Jr. ..................... 342/94 |
| 3,745,571 | A | * | 7/1973 | Chwastyk et al. ............ 342/194 |
| 3,860,924 | A | * | 1/1975 | Evans ............................ 342/94 |
| 3,968,490 | A | * | 7/1976 | Gostin .......................... 342/93 |
| 4,114,153 | A | * | 9/1978 | Neidell ........................ 342/108 |
| 4,143,371 | A | * | 3/1979 | Salvaudon et al. ............ 342/94 |
| 4,308,536 | A | * | 12/1981 | Sims et al. .................... 342/70 |
| RE31,509 | E | * | 1/1984 | Neidell ........................ 342/108 |
| 4,463,356 | A | * | 7/1984 | Short et al. ................... 342/94 |
| 4,809,002 | A | * | 2/1989 | Togashi et al. .............. 342/160 |

(Continued)

FOREIGN PATENT DOCUMENTS

EP    0 851 238 A2    7/1998

(Continued)

OTHER PUBLICATIONS

International Search Report dated Sep. 1, 2005.

(Continued)

*Primary Examiner*—Thomas H Tarcza
*Assistant Examiner*—Matthew M Barker
(74) *Attorney, Agent, or Firm*—Buchanan Ingersoll & Rooney PC

(57) ABSTRACT

A method of extracting a radial velocity characteristic of a target from coherent pulse bursts comprising the steps of applying to data a 'best fit' model of the echo returns from a target in the presence of clutter to obtain a residue (error) value and minimising the error value by a predetermined method to give the best fit value for the target radial velocity. The method enables more information to be retrieved from coherent bursts than conventional methods and therefore greatly enhances performance of radiation pulse echo detection.

16 Claims, 8 Drawing Sheets

U.S. PATENT DOCUMENTS

| | | | | |
|---|---|---|---|---|
| 4,887,050 | A | * | 12/1989 | Borth et al. ................... 331/34 |
| 4,890,113 | A | * | 12/1989 | Jacomini ................... 342/163 |
| 4,910,465 | A | * | 3/1990 | Dillman ........................ 327/7 |
| 4,972,194 | A | * | 11/1990 | Carrara et al. ............... 342/163 |
| 5,081,459 | A | * | 1/1992 | Guillerot et al. ............. 342/90 |
| 5,117,698 | A | * | 6/1992 | Baumoel ................. 73/861.28 |
| 5,225,839 | A | * | 7/1993 | Okurowski et al. ......... 342/174 |
| 5,231,402 | A | * | 7/1993 | Ludloff et al. ............. 342/192 |
| 5,311,189 | A | * | 5/1994 | Nagel .......................... 342/95 |
| 5,451,961 | A | | 9/1995 | Rubin et al. |
| 5,457,462 | A | * | 10/1995 | Mitsumoto et al. ............ 342/93 |
| 5,559,518 | A | | 9/1996 | DiDomizio |
| 5,686,919 | A | | 11/1997 | Jordan et al. |
| 5,818,383 | A | * | 10/1998 | Stockburger et al. ........ 342/109 |
| 6,067,041 | A | * | 5/2000 | Kaiser et al. ................. 342/171 |
| 6,894,638 | B2 | * | 5/2005 | Matsuda et al. ........... 342/26 R |
| 6,982,668 | B1 | * | 1/2006 | Doerry et al. ............... 342/160 |
| 2002/0196179 | A1 | * | 12/2002 | Mattox ....................... 342/194 |
| 2004/0046689 | A1 | * | 3/2004 | Rees et al. ................... 342/159 |
| 2005/0179585 | A1 | * | 8/2005 | Walker et al. ............... 342/134 |

FOREIGN PATENT DOCUMENTS

| | | |
|---|---|---|
| GB | 1 291 239 | 10/1972 |
| GB | 2 074 807 A | 11/1981 |

OTHER PUBLICATIONS

International Preliminary Report on Patentability dated Oct. 9, 2006.

\* cited by examiner

Range ambiguity

VELOCITY EXTRACTION

RELATED APPLICATIONS

This application claims priorities under 35 U.S.C. 119 to Great Britain Application No. 0414208.9 filed Jun. 24, 2004 and European Application No. 04253789.4 filed Jun. 24, 2004, and as a National Stage Application Under 35 U.S.C. §371to PCT Application No. PCT/GB2005/050094 filed as an International Application on Jun. 21, 2005 designating the U.S., the entire contents of which are hereby incorporated by reference in their entireties.

BACKGROUND

1. Field

This invention concerns improvements relating to velocity extraction in the field of radiation pulse echo detection. More particularly but not exclusively, this invention concerns extraction of the velocity of a target from the returns.

2. Related Art

Radiation pulse echo detection systems, such as radar, transmit a set of one or more coherent strings of pulses (coherent bursts) which are reflected by objects. The echoes of pulses are used to detect and locate distant objects.

Conventionally, a surveillance radar would estimate the target radial velocity using multiple estimates of the target range taken at different times. It is now common practice to filter the returns to remove clutter returns (those returns from items not of interest), leaving any returns from moving items of interest relatively unaffected. This is known as Moving Target Detection (MTD) or Moving Target Indication (MTI). Such schemes can be modified using multiple filters to obtain some measure of target radial velocity but suffer from problems due to large clutter returns 'spilling' into adjacent filters, thereby producing erroneous velocity measurements.

One of the main tasks of modern radars and sonars, is to identify and track moving targets. The accuracy of tracking is greatly enhanced if the range ambiguity and radial velocity of the target input plots are known. Only plots with matching range ambiguity and velocity will then be associated with those from previous measurements thereby significantly reducing the probability of mis-association, track seduction and false track rate.

Whilst traditional filtering methods remove the clutter from the in-phase (I) and quadrature (Q) components (the first being in phase with the transmitted signal and the second in quadrature with the transmitted signal) and typically return the target amplitude, they do not easily output the target radial velocity nor the range ambiguity of the target.

BRIEF SUMMARY

The present invention aims to overcome or at least substantially reduce some of the above mentioned problems.

According to a first aspect of the invention, there is provided a method of extracting the target radial velocity from one or more coherent radiation pulse bursts comprising the steps of: (a) receiving radiation echo returns from a scene; (b) processing the returns into in-phase (I) and quadrature (Q) components; (c) measuring returns at intervals to provide sampled data; (d) applying a function to the I-Q returns; (e) modifying the function to match the sampled data as a function of velocity in a predetermined fashion; and (f) determining the target radial velocity in dependence upon said modification step of the function. This method advantageously produces accurate velocity measurements and is a real time process, fast enough to work at, for example, radar type timescales with data rates of a few MHz. The method is applicable to various radiation pulse echo detection systems that use coherent bursts for clutter rejection purposes.

Preferably, step (d) comprises fitting a curve to the I-Q returns (using known system parameters) and step (e) comprises optimising the fit to the sampled data as a function of velocity in a least squares fashion to give the target radial velocity.

Other target parameters, such as target amplitude, range ambiguity and azimuth, may then be derived from the fit to the sampled data.

Conveniently, the model of clutter return, used in the fitting of a curve to the I-Q returns, is a low order polynomial in I and Q. This is a simple model that provides a good fit to clutter return. Alternatively, if desired, the model of clutter return could be a different analytic function.

The returns may be measured at non-equi-spaced intervals. The use of non-equi-spaced intervals provides unambiguous velocity measurement whereas sampling at a regular rate can lead to multiple solutions.

The transmission frequency may be altered between bursts. This also gives unambiguous velocity measurement.

Each burst preferably consists of multiple pulses transmitted at irregular intervals (non-constant pulse repetition interval bursts). Digital Fourier transform techniques previously used for the same purpose of target parameter extraction cannot easily be used with such in-burst stagger.

The bursts are optionally internally coherent but mutually incoherent. This gives an improved measure of target velocity, amplitude, range ambiguity and azimuth.

The fit residues from adjacent range cells in which a target was detected may be summed to obtain the target velocity and other parameters. This increases the probability of detecting targets split between range cells.

Conventional MTI/MTD filtering may be carried out before applying a function to the I-Q returns in which a target was detected. Post-detection processing of the data requires a lower processing capacity than pre-detection processing.

Optionally, post-detection processing is used in combination with pre-detection processing to limit the range cells processed to increase efficiency.

It is to be appreciated that the present invention may be embodied in software. Accordingly, the present invention extends to a computer program element comprising program code for configuring a programmable device apparatus or system to implement the above described method. Suitably, the computer program is stored on a carrier medium.

Further, the present invention extends to a data processing system or apparatus adapted and arranged to implement the above described method.

Preferably, there is provided a data processing system comprising a transmitter; an antenna; a receiver; signal processing means; an I and Q component splitter; an analog-to-digital converter, and processing means to fit a predetermined function to the I and Q components.

DESCRIPTION OF THE DRAWINGS

The invention will now be described by way of example and with reference to the accompanying drawings, in which.

DETAILED DESCRIPTION

Figure 1:
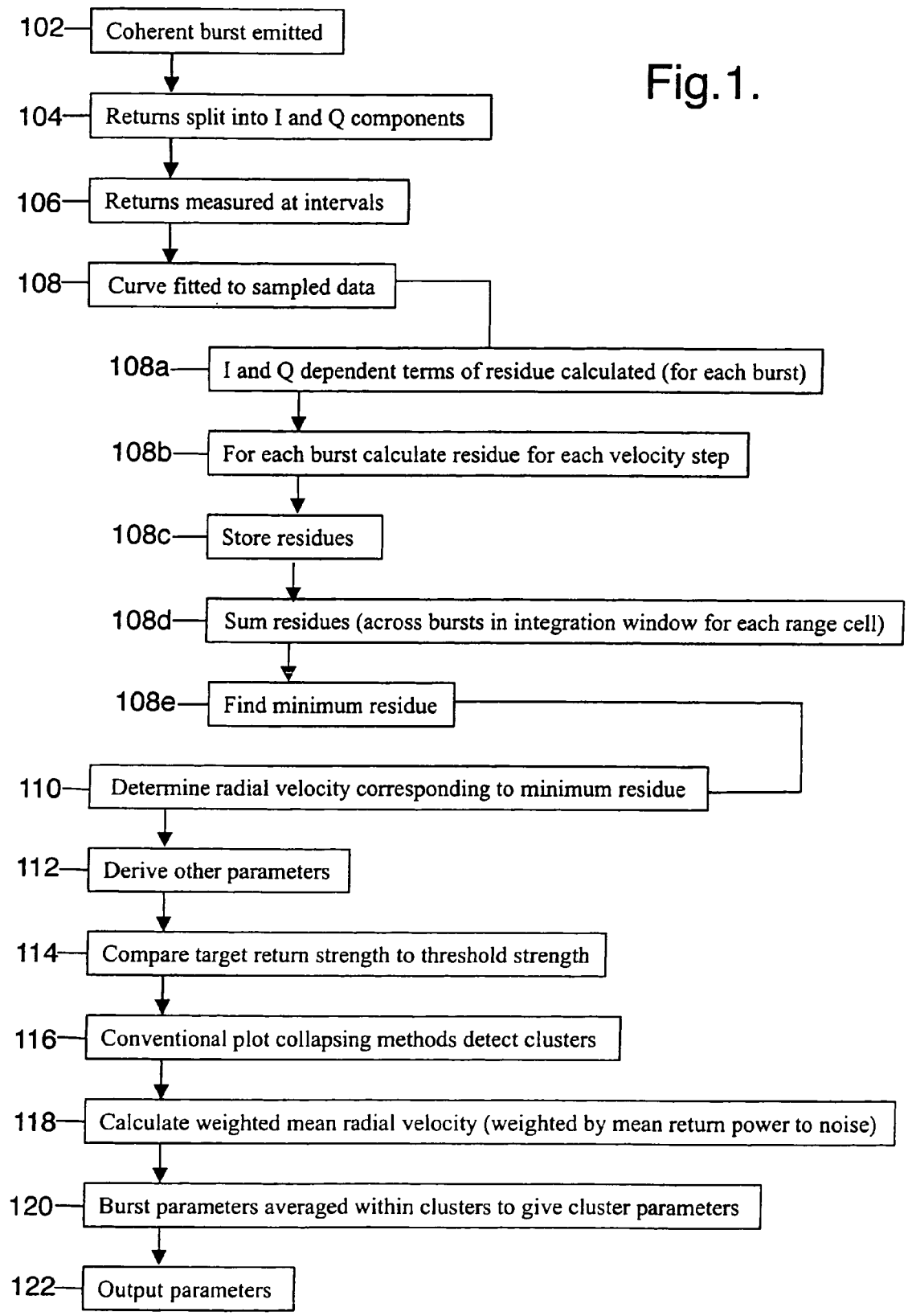
FIG. 1 is a flowchart illustrating the steps involved in a method embodying the invention.

FIG. 1 shows the steps of a method embodying the invention. As shown, a coherent burst is emitted (step 102) from a radar antenna and reflected by objects in its path. The returns from a coherent burst are split (step 104) into two mutually orthogonal components, the in-phase (I) and quadrature (Q) components. Measurements are made (step 106) of the return signal (returns) at predetermined time intervals. The returns from the scene constitute noise (clutter returns) and target returns, if a target is present.

The returns from a target will typically constitute a helix whose long axis is centred along the time axis. The clutter returns cause the centre of the helix to lie along the clutter trajectory. For stationary clutter this is a straight line parallel to the time axis; for moving clutter the line is curved, but substantially parallel to the time axis.

Figure 2:
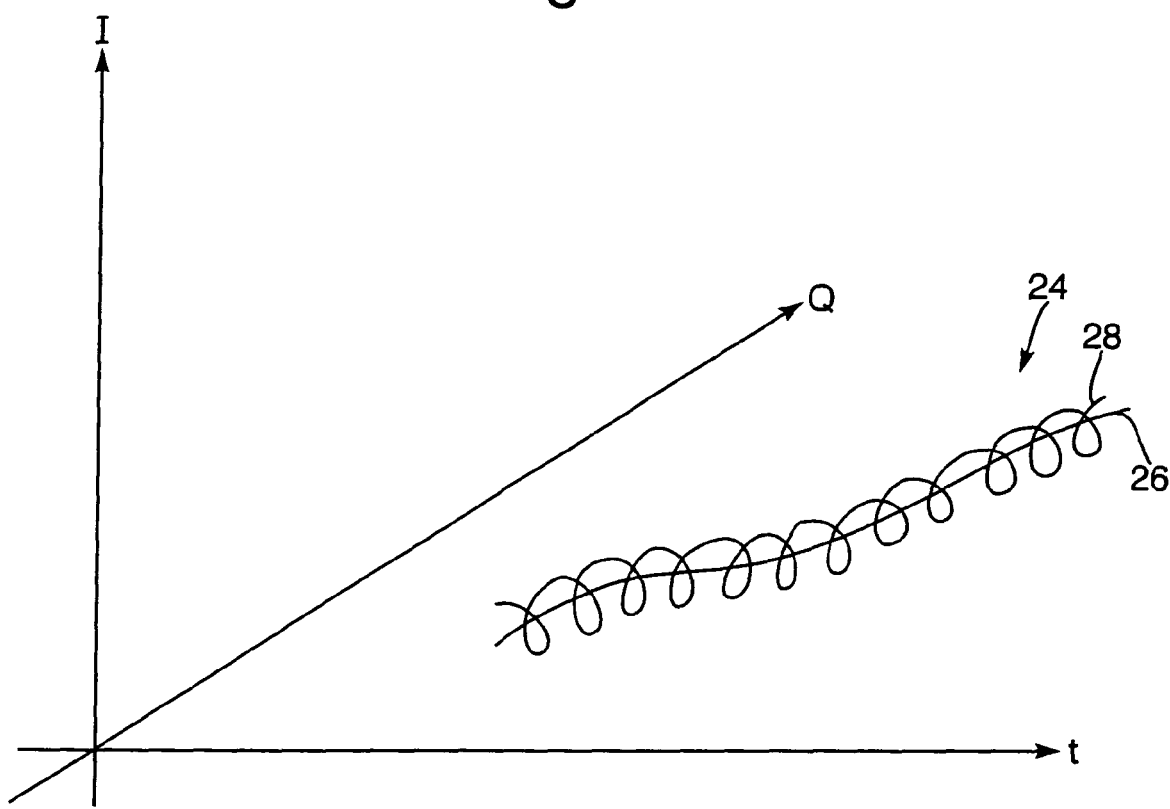
FIG. 2 shows a typical return in I-Q space.

It is therefore assumed that in I-Q space the return signal consists of a noise-contaminated helix. FIG. 2 shows an exemplary return signal 24 in I-Q space. The clutter trajectory 26 is substantially parallel to the time axis, although curved due to moving clutter. A target helix 28 is imposed onto the clutter trajectory. The motion of the target imposes a changing phase shift on the signal which is used to estimate the radial velocity from the rotation rate of the sample vectors, i.e. the helix pitch is proportional to the target radial velocity. The radius of the helix is proportional to the target cross-section at the transmitted frequency, and the helix axis lies on a clutter return curve that can be represented by a low order polynomial in time.

Returning to FIG. 1, a curve constituting a simple low order polynomial in I and Q model of the clutter return, and a helical model of the target return is therefore fitted (step 108) to the sampled data to describe the returns assuming a target with a guess velocity is present together with clutter.

The fit to the sampled data is optimised (steps 108a-e) in a least squares fashion to minimise the error value, or residue, $\epsilon$, given by $$\varepsilon^2 = \sum_b \sum_{m=0}^{\gamma} \left( \sum_{n=0}^{\alpha} (I_{b,n} + iQ_{b,n}) t_{b,m}^n + \left( \sum_{p=0}^{\beta} a_{b,p} t_{b,m}^p \right) \exp[i(\omega_b t_{b,m} + \phi_b)] - (Isample_{b,m} + iQsample_{b,m}) \right)^2$$

with respect to velocity v, where:

$$\omega_b = \frac{2v\Omega_b}{c};$$

$\Omega_b$ is the frequency (in radians per second) of the transmitted signal for burst b;

c is the speed of the signal propagation;

$$\left( \sum_{p=0}^{\beta} a_{b,p} t_{b,m}^p \right) = A_b$$

is the best estimate of the mean amplitude of the target at time t, seen in burst b;

$Isample_{b,m}$, $Qsample_{b,m}$ are the in-phase and quadrature components of the measured signal for pulse m in burst b;

$I_{b,n}$, $Q_{b,n}$ are the best estimate of the components of the measured signals due to the clutter seen in burst b, and $\phi_b$ is the phase at the start of burst b.

The best fit target radial velocity is obtained (step 110) and other target parameters are derived (step 112), for example the target amplitude is extracted from the radius of the helix. The return strength is compared (step 114) with a threshold target return strength which is chosen to produce a desired probability of false detection.

Integrating several bursts together improves the detection probability for a target. The number of bursts over which summing occurs is referred to as the detection or integration window. For rotating radars where target returns are smeared by the rotation of the antenna, the integration window is usually set to the number of bursts transmitted in the time the radar sweeps a beamwidth.

Since targets may exceed one range cell in size or bridge range cell boundaries the accuracy of the velocity extraction process can be increased if any adjacent cells that also contain returns from the target are included along with those cells in the normal integration window. Similarly, since the beam shape of the radar is smeared in azimuth, the same target will be detected at the same range by several bursts. These detections in adjacent bursts at a common range are also grouped together as belonging to the same plot. This clustering of adjacent detections is known as 'plot extraction'. The various methods to do this clustering, whether in range then azimuth or in azimuth then range, and the methods for grouping detections at common ranges and azimuths but differing, though adjacent, elevations for three-dimensional radars, are known as 'plot collapsing' (step 116). These methods enable a single plot to be formed, corresponding to the best estimate of the target position, rather than a cluster of detections (partial plots). The most common methods group in range, providing a plot start and stop range in each burst, then group any azimuthally adjacent overlapping detection runs into the cluster. The plot position is then set to the centre of the cluster. The centre position can be found in a number of different ways, for example, the 'centre of mass' of the cluster or from halving the position of the extreme position of the partial plots forming the plot in range and azimuth. Alternatively, the partial plots are passed to a track extractor for outputting parameters. Track extractors make use of information from previous scans, knowledge of target range or velocity ambiguities to improve the accuracy of the information extraction and to resolve any plot track association conflicts (when two or more targets are too close together to be resolved by conventional plot collapsing methods but where the knowledge that two or more targets are expected close together with, for example, different velocities enables the returns to be separated into two more more clusters separated in velocity space).

For each partial plot (i.e. detection) in the cluster, the ratio of the mean residue to the minimum residue is the mean return power-to-noise ratio for the target in that cell. By weighting the radial velocity from each cell in the cluster by the mean return power-to-noise in that cell, summing all the weighted velocities and dividing by the sum of the weights, the weighted mean radial velocity is obtained (step 118). This is a better estimate of the radial velocity than a simple mean of the velocities as it gives greater weight to those velocities that have better signal-to-noise ratios and thus accuracies.

The burst parameters are averaged within the clusters to give the cluster parameters (step 120) and the parameters are outputted (step 122).

Figure 3:
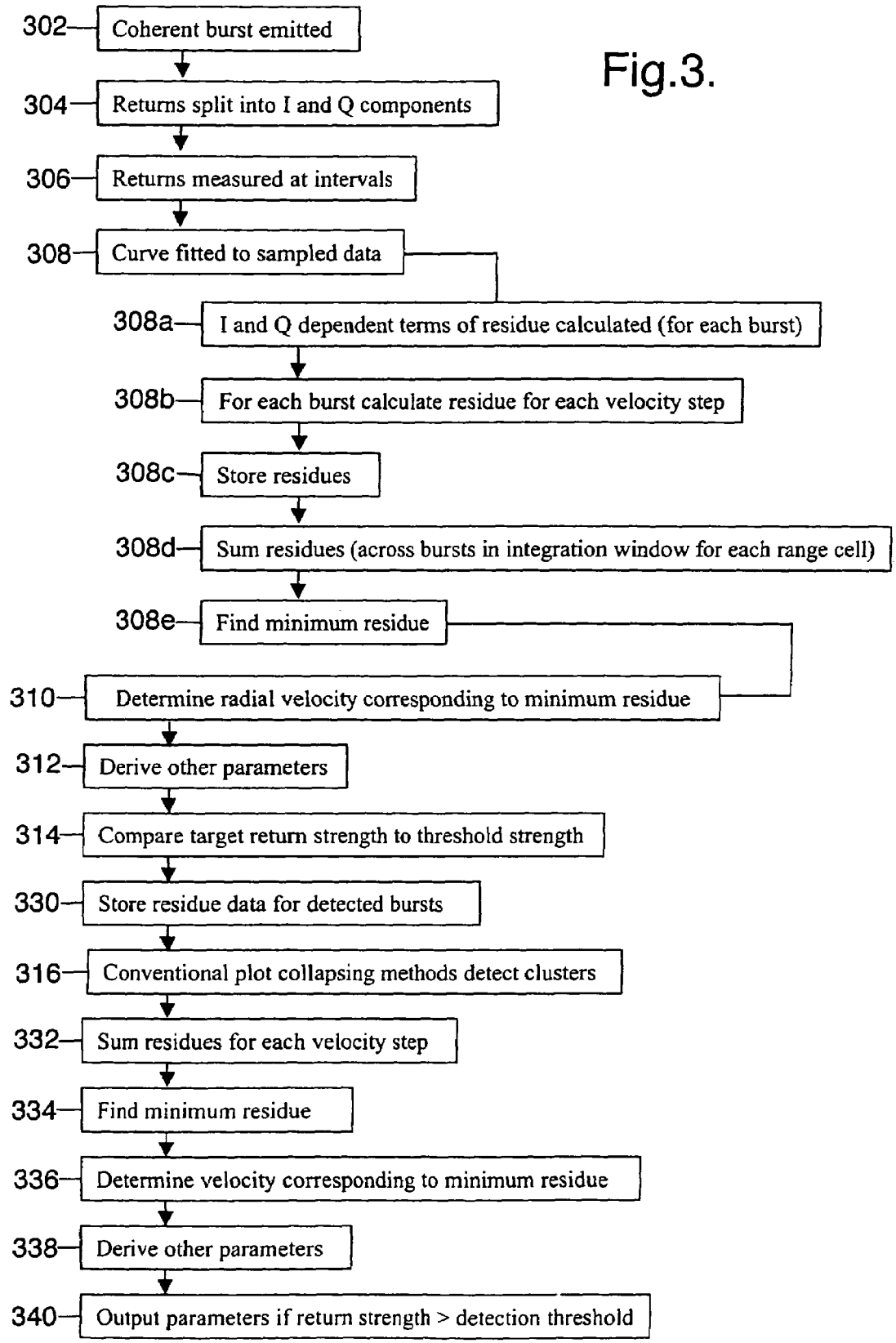
FIG. 3 is a flowchart of a variant of the method shown in FIG. 1.

Optionally, the residues from adjacent range cells with bursts that cross the detection threshold are summed (see FIG. 3; where the final two digits of the numbered steps are the same as those in numbered steps beginning with a '1' in FIG. 1 the steps are equivalent, but not necessarily identical). As each burst is processed, detections are either declared or not for each range cell and the residues stored for those bursts with detections (step 330); The residues for each velocity step are summed (step 332) and the minimum residue found (step 334).

The target radial velocity and other parameters are obtained (steps 336, 338) from the new summed residue, i.e. summation takes place across the partial plots, not across the integration window. The original (partial plot) detection threshold for target strength at step 314 can then be quite low with a high plot detection threshold applied (step 340) to the summed data to provide the required probability of false plot detection. The lower original threshold at step 314 enables smaller targets to be detected, although with a higher probability of false alarm. The higher post interaction threshold at step 340 re-establishes the lower probability of false detection. As more bursts are integrated together, true targets that are split between range cells, for instance, integrate up and have a higher probability of detection.

In FIGS. 3, 4, 5, 6 and 7, where the final two digits of the numbered steps are the same as those in numbered steps beginning with a '1' in FIG. 1 the steps are equivalent, but not necessarily identical.

In a further embodiment of the invention, the integration process is carried out post-detection. While having a lower sensitivity, post-detection processing of the data requires a lower processing capacity than pre-detection processing. In the method shown in FIG. 4, conventional MTI/MTD filtering is carried out (step 444) on the I and Q components of the echo returns. In both MTI and MTD filtering, the filters are equivalent to multiplying the returns within a burst by a set of weights and summing the results, the weights being chosen to reject the expected clutter, whilst allowing the returns from moving clutter to sum constructively. The I and Q components for the bursts in each range cell where detections occur are stored (step 446) before conventional plot collapsing methods are used (step 416) to detect clusters. I and Q dependent terms of residue are calculated (step 408a) for each burst in a group of adjacent partial plots (in each 'cluster' of detections) as a function of velocity. For each burst the residue is calculated (step 408b) and stored (step 408c) for each velocity step. The residues are then summed (step 408d) across all bursts included in the plot. The minimum residue is found (step 408e) and the target radial velocity and other parameters determined (steps 410, 412) before being outputted (step 422).

Figure 4:
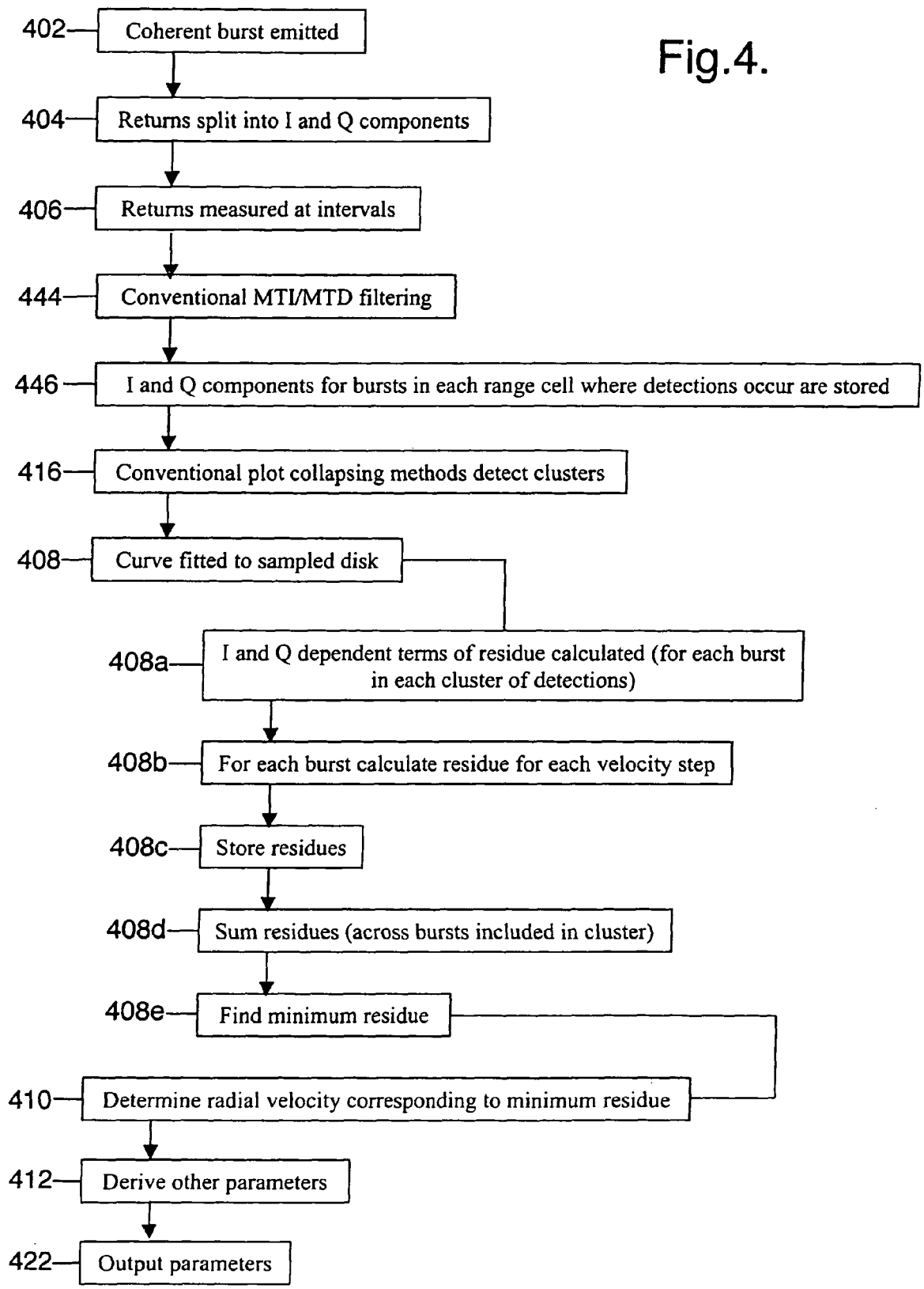
FIG. 4 shows an alternative embodiment of the invention.
Figure 5:
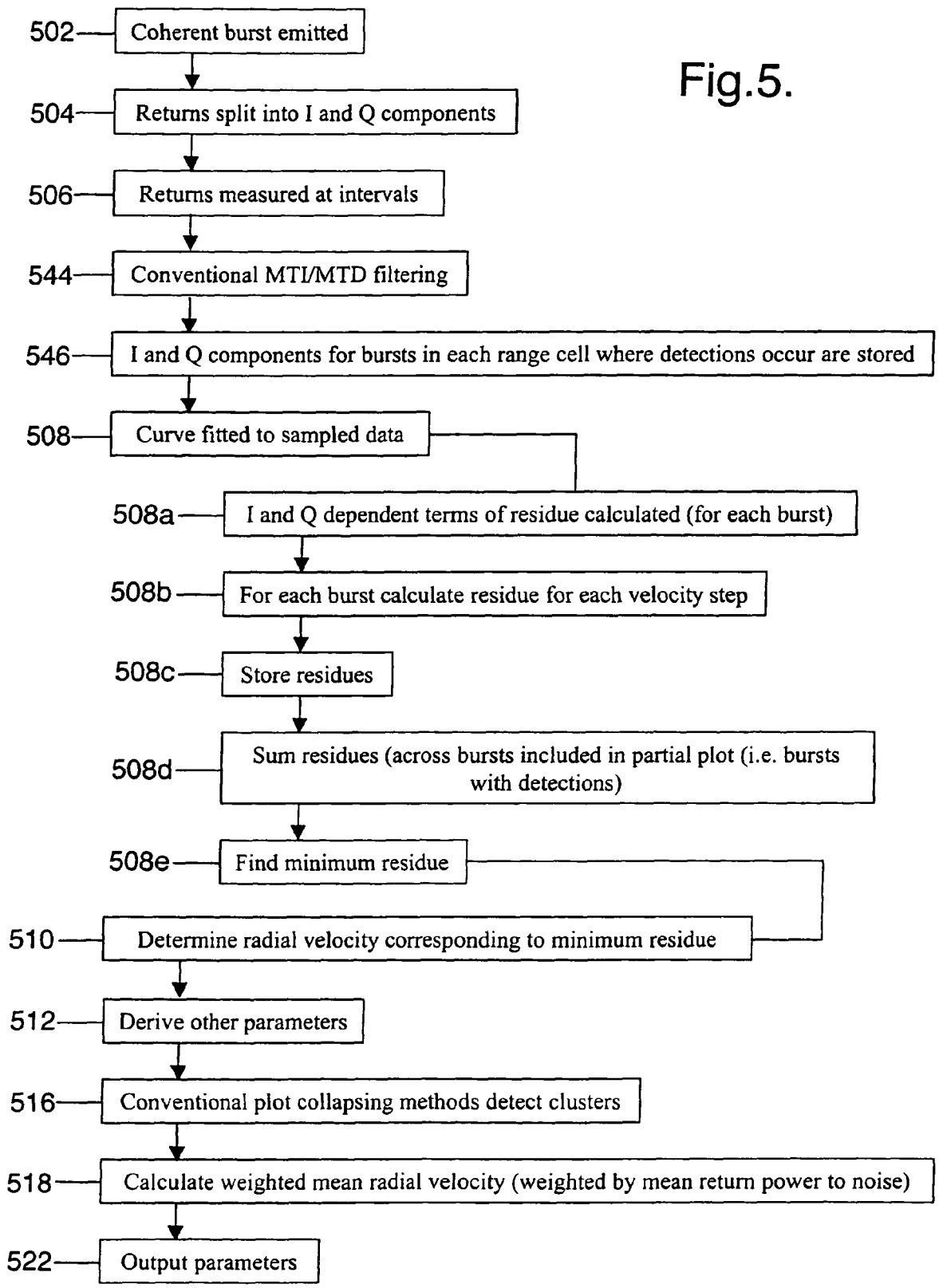
FIG. 5 is a flowchart illustrating a variant of the method shown in FIG. 4.

Alternatively, the plot collapsing (step 516) may be carried out after the velocity extraction processing (see FIG. 5). In this case, each partial plot contributes a velocity measure, the weighted mean radial velocity is then calculated (step 518) and the parameters outputted (step 522). This process is more computationally efficient (the velocity being extracted from only those range cells where detections occur) but less accurate than the process illustrated in FIG. 4 where the velocity is extracted from data for all range cells in the cluster that forms the plot.

Clearer identification of minima is obtained by enhancing the difference between minima and peak values. This can be done by summing together all curves but this requires a great amount of computing power. The use of post-detection processing reduces the computing power required. The post-detection processing method involving plot collapsing before the calculation of residues (FIG. 4) is preferred to the post-detection processing method involving the calculation of the weighted mean radial velocity (FIG. 5) as more bursts are included in the calculation so the likelihood of target detection is increased.

It is more efficient to discard those cells which clearly only contain noise, before carrying out the velocity extraction processing. This extra level of processing can reduce the processing load further downstream by significantly reducing the number of cells which receive the full pre-detection processing.

By applying a simple MTI filter with a low threshold (as compared to the threshold used in the processes illustrated in FIGS. 4 and 5) to the summed returns in all cells, the large number of cells where no target is illuminated and that clearly only contain clutter or noise and that have a very low probability of containing a target as seen from their spectral content are eliminated. In this manner, more real targets are detected and less false targets are found, compared to the processing methods shown in and described with reference to FIGS. 1, 3, 4 and 5. Examples of such methods are illustrated in FIGS. 6 and 7.

Figure 6:
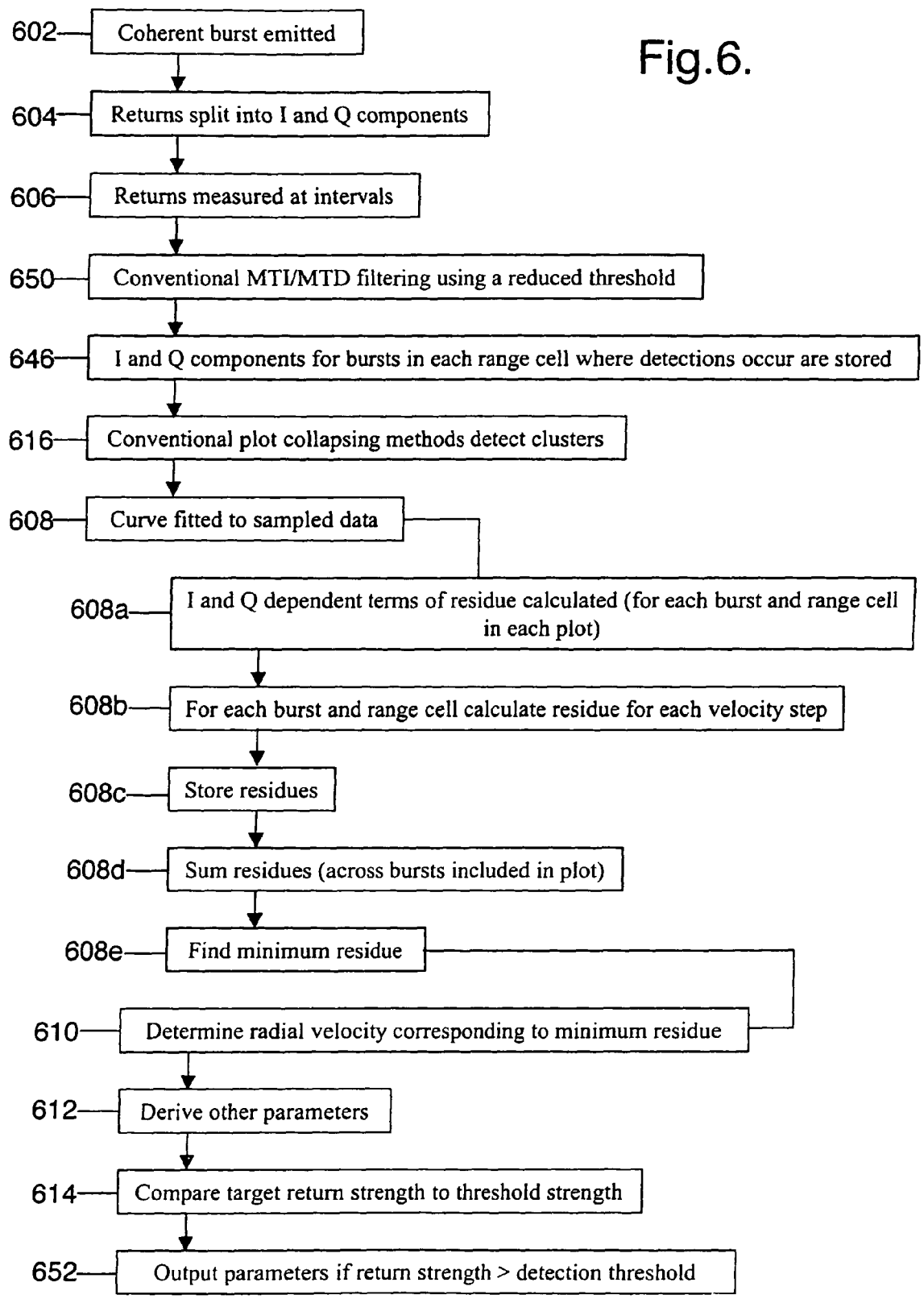
FIG. 6 is a flowchart of an alternative embodiment of the invention.
Figure 7:
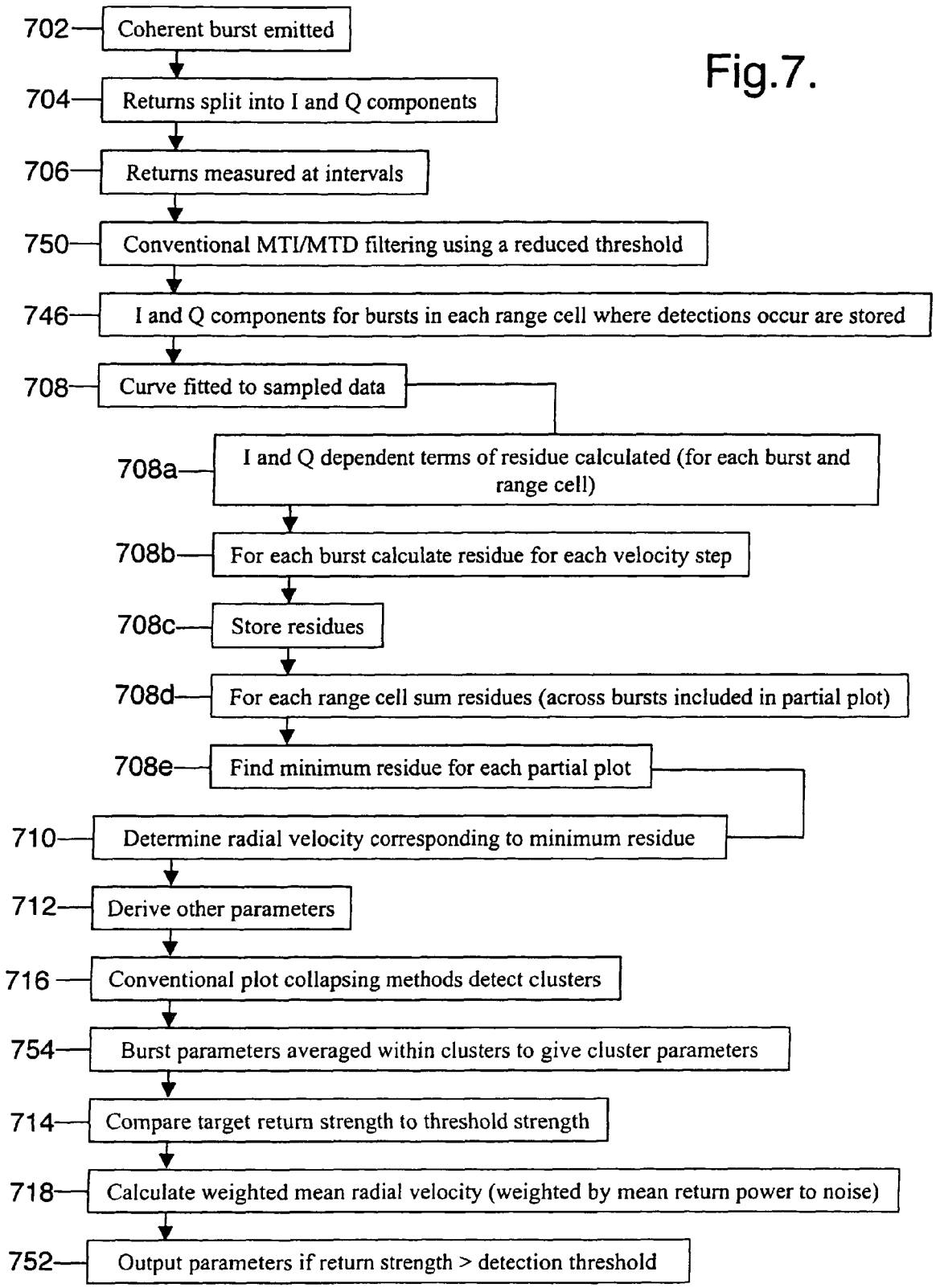
FIG. 7 shows a variant of the method shown in FIG. 6.

In the method shown in FIG. 6, conventional MTI/MTD filtering is carried out (step 650) using a reduced threshold, on the I and Q components of the echo returns. The use of a reduced threshold increases the likelihood of target detection. The I and Q components for the range cells with bursts where detections occur are stored (step 646) before conventional plot collapsing methods are used (step 616) to detect clusters. I and Q dependent terms of residue are calculated (step 608a) for each burst in a group of adjacent partial plots (in each 'cluster' of detections) as a function of velocity. For each burst the residue is calculated (step 608b) and stored (step 608c) for each velocity step. The residues are then summed (step 608d) across all bursts included in the plot. The minimum residue is found (step 608e) and the target radial velocity and other parameters determined (steps 610, 612). The target return strength is compared to a threshold value (step 614) and the parameters are outputted if the target return strength is greater than the detection threshold (step 652). The threshold value is chosen to maintain the false detection rate at the required level, previously increased by the use of a reduced threshold during filtering (step 650).

In an alternative method, the plot collapsing (step 716) may be carried out after the velocity extraction processing (see FIG. 7) and the burst parameters are averaged within clusters to give the cluster parameters (step 754). The target return strength is compared to a threshold value (step 714), the mean weighted radial velocity calculated (step 718) and the parameters outputted if the target return strength is greater than the detection threshold (step 752). The process shown in FIG. 7 is more computationally efficient but less accurate than the FIG. 6 process.

When a coherent burst is transmitted objects will be illuminated at ranges that are sufficiently far away that the echoes from any particular pulse are not received back at the radar until after one or more further pulses have been transmitted. These longer-range returns are ambiguous in range; the radar will normally interpret them as coming from a close range as calculated from the time interval from the time of the reception and the transmission of the last pulse prior to reception. The problem can often be avoided by using in-burst stagger (i.e. the pulse repetition interval (PRI), the time between transmitted pulses, is not constant); the echoes from ambiguous range targets are spread over a number of different ranges and often do not integrate up to a sufficient level to give a high probability of detection. For constant PRI bursts the ambiguous returns from any one target will, within that burst, all lie at the same erroneous range and will coherently sum to give a larger return, which may then be detected. For multiple bursts at different frequencies but with common PRI these ambiguous range targets then integrate across the bursts to give false detections. These false detections, i.e. the reporting of a real target at an incorrect location, are problematic for many MTI and MTD radars. The problem is exacerbated when multiple bursts with different PRIs are integrated together. In this case, whilst small ambiguous range targets do not integrate across the bursts as they appear at different locations in each burst, larger targets with sufficient return strength for detection to occur on the basis of a single burst then appear as detections in up to as many different locations as there are bursts integrated. Current methods of dealing with this problem, commonly known as ambiguous range trap (ART) methods suffer from a number of problems, most notably the blanking of range cells where ambiguous targets appear to be and therefore the erroneous deletion of cells with real targets present.

The method in accordance with this invention provides a means, not only of reliably identifying when the returns in the burst come from an ambiguous range target, but also of obtaining the order of ambiguity of the target.

The target range ambiguity can be estimated by considering whether a better fit to the data would be obtained by assuming that one or more of the initial returns do not lie on the helix. A target is a zero order ambiguous target (i.e. an unambiguous range target) if the first transmitted pulse is received before the second pulse is transmitted. Thus, for a zero order ambiguous target, the return from the first pulse would contain a return from the target and lie on the helix. An ambiguous range target (one with an ambiguity order higher than zero) would not have any signal from the target contained in the first received pulse and thus the received signal would lie on the axis of the helix. The ambiguity order n is given by the number of first received pulse signals lying on the axis of the helix, only the subsequently received signals lying on the helix itself.

When it is known that only a single or at least a very sparse set of targets is present, or where the bursts being integrated together all have the same PRI (although they may have different transmission frequencies) it is possible to carry out a simple minimising of the residue with respect to ambiguity and velocity.

In the latter case, when all the bursts use a common PRI, the previously described processing in any of the variants may be used with the addition that the residues are calculated for each of the possible range ambiguities of the target. The target velocity and range ambiguity is found simply by determining the velocity and range ambiguity for which the residue is a minimum. In the former case, where the PRIs differ from burst to burst but it is known that only one, or at least very few, targets are present, the process is slightly more complicated in that the returns from each burst are first replicated to all possible range ambiguities. The unfolded returns from different bursts are then realigned over the possible ambiguous ranges so the residues from returns at the ambiguous ranges in all bursts can be calculated and summed together for each possible ambiguity. At the correct range the returns from all the bursts align, and therefore the minimum will be deepest. Summation of residues at all possible ambiguous ranges will give the deepest minimum thereby solving the range ambiguity and target velocity. Having determined velocity and range ambiguity the processing then follows that of the previously described methods.

For the more normal case where the PRIs differ from burst to burst and the potential number of targets is not very small, a more convoluted process is required to extract the range ambiguity. The simplest approach to extracting the range ambiguity is to extract it on a burst-by-burst basis. The minimum residue for each range cell, or at least those where there is a possibility that a target is present, with respect to both velocity and range ambiguity is determined. The range ambiguity at which this minimum occurs is taken to be the range ambiguity order of the return. From the apparent range and the order of the ambiguity the actual range of the return can be determined.

With ambiguous range returns, a choice of methods equivalent to the various methods of extracting the radial velocity from an unambiguous return is available. The returns from the bursts within an integration window at a common (ambiguous) range can be processed to give a maximum likelihood velocity and target size, or any other of the available parameters extracted either by a simple weighted mean approach or by re-computing the residues for the whole set of returns. For long coherent bursts this approach suffers from the difficulty that the difference in depth of the residue between adjacent orders of ambiguity is small and therefore it is possible that for relatively weak targets the wrong order of ambiguity may initially be chosen. Errors of this sort are typically only of one or two ambiguities; by unfolding the target to just those ambiguities around the most likely ambiguity order and summing the residues across the bursts in the integration or plot window (depending on the method of combining the bursts used), then seeking the deepest minimum from this limited set of possible target locations, the most likely velocity, position and other target parameters can be extracted from the data. The most likely azimuth may possibly also be extracted.

For those processes that involve pre-detection processing, such as illustrated in FIGS. 1 and 3, the range ambiguity of each burst is determined (step 112 and 312 respectively) and bursts with returns showing targets that form clusters in range and/or range rate space, as determined from the extracted range ambiguity, are then combined. In the former case, where clusters are formed in range, the velocity is determined, on the assumption that only one target is present, by processing all bursts with returns above the detection threshold at that range to extract the best fit velocity and mean return strength. In the latter case, where clusters are formed in range rate space, only bursts with velocities that unfold to a common velocity are included in the processing. This works best when there is a high probability of two targets with differing velocities, spatially unresolved, at the same range.

Figure 8:
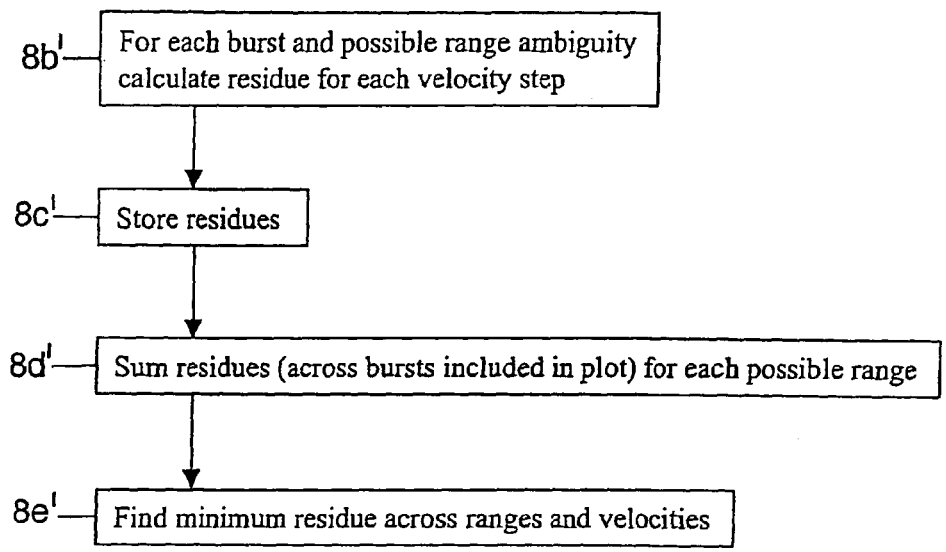
FIG. 8 shows the optional steps for extraction of range ambiguity.

For processes that involve post-detection processing, the bursts included are those involved in the detection, irrespective of whether their range ambiguities match, i.e. the range ambiguity is solved at the same time as the velocity is extracted from all contributing bursts. In the processes shown in FIGS. 4 to 7, steps 408b to e, 508b to e, 608b to e and 708b to e are replaced with steps 8b' to 8e', shown in FIG. 8. For each burst and possible range ambiguity, the residue is calculated (step 8b') for each velocity step. The residues are stored (step 8c') and summed (step 8d') (across bursts included in the plot) for the possible ambiguities for each detection. The minimum residue is then found (step 8e') across both range and velocity (at each range ambiguity the velocity corresponding to the minimum residue will be different).

Alternatively, in FIGS. 4 to 7, residues can be determined in all range/azimuth cells out to the maximum possible ambiguity for all range cells with detections for all bursts over some sector. The use of a fixed sector width overcomes the problem that a cluster at one ambiguity may partially overlap with a cluster at another, preventing automatic decisions on processing ranges. A model is then set up with all possible target position/velocity combinations over the sector space and the residues corresponding to those combinations found. The deepest minimum over the multidimensional ($2n$) space (positions and velocities for each of the n possible targets) is selected. The velocity and range corresponding to the minimum residue is then determined.

When extracting range ambiguity, two types of false result can occur. A false velocity may be outputted and false targets may be 'detected' due to ghosts (where returns from two or more targets at different ranges seen in bursts with different pulse repetition intervals unfold onto the same range with differing ambiguities resulting in an erroneous detection). Both false outputs can be reduced by including as many bursts where the target is present as possible since true targets integrate up while false targets do not.

When range ambiguity is extracted using pre-detection processing, the number of cells in which a false alarm can occur is increased, due to the unfolding of ranges to the full ambiguous range limit. Therefore a higher threshold is needed to maintain the required false detection rate and reduce the possibility of the residue minima being due to ghosts. This higher threshold is applied after plot collapsing to maintain the maximum sensitivity. The minima in the set of cells corresponding to potential ghosts are compared, the deepest minimum being the most likely solution to the target's radial velocity and range ambiguity.

If a target is range ambiguous and the range ambiguity is not extracted, the fit to the data is not as accurate as possible, giving rise to an inaccurate velocity extraction.

Tabulation of the error values with respect to velocity and/or range ambiguity gives a measure of confidence in the relevant measurement. The sharper the minimum, the narrower the uncertainty in the measurement. The deeper the minimum with respect to the next deepest, the more confidence there is in the result.

The azimuth of the target (the angular direction of the target from a defined direction, e.g. north, in a horizontal plane) is then calculated (for rotating radars only) by taking the ratio of the rate of change of target returns strength to returns strength for each coherent burst included in the process and fitting the resultant normalised gradients to the beam shape. The resultant ratios are used to derive the polynomial $$\sum n \left(\frac{a_n}{a_0}\right) t^{n-1} = 0$$

the solution for which gives the time at which the antenna pointed at the target. From that time, the azimuth of the target is determined as the azimuthal direction of the antenna at time t.

The crossing rate of the target, i.e. the rate at which the target crosses the field of view of the antenna, can also be determined from the beam shape. This can be combined with the radial velocity to give the target velocity.

Figure 9:
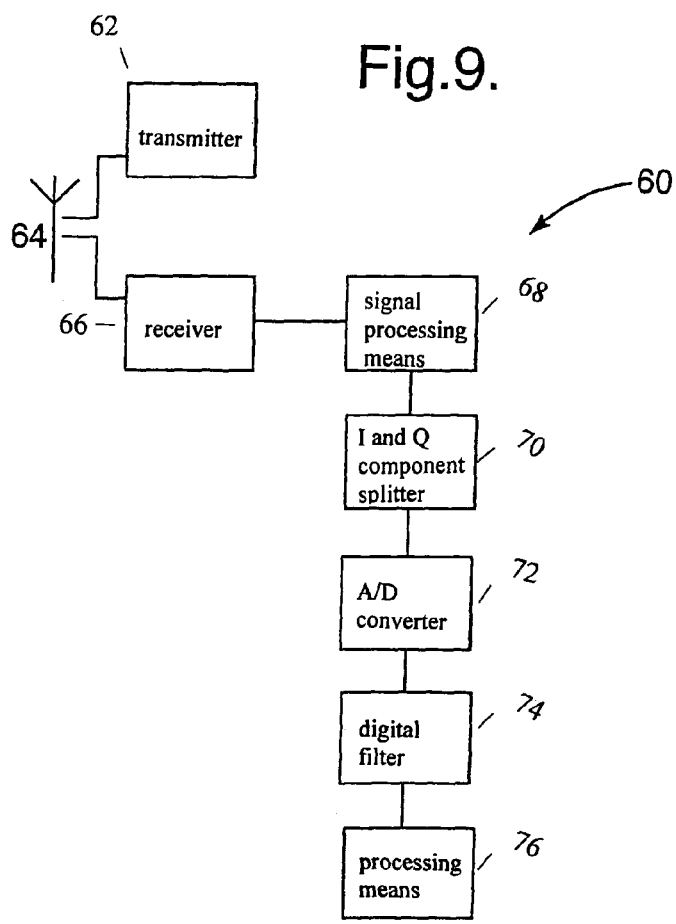
FIG. 9 is a schematic view of a data processing system in accordance with one aspect of the invention.

An embodiment in accordance with another aspect of the invention is shown in FIG. 9. A data processing system 60 comprises a transmitter 62; an antenna 64; a receiver 66; signal processing means 68; an I and Q component splitter 70; an analog-to-digital converter 72; a digital filter 74 and processing means 76 to fit a predetermined function to the I and Q components. The transmitter 62, connected to processing means 76 (connection not shown) or other processing means (not shown), emits coherent radiation bursts from the antenna 64. Radiation echo returns of the pulse bursts are received from a remote scene by receiver 66. Signal processing means 68 may include, for example, RF filtering to remove out of band signals, automatic gain control (AGC) to reduce the gain when strong signals are received to prevent overload, beam forming to focus the radar to look in one specific direction, jamming null steering to reduce the antenna gain in the direction of jammers or pulse compression to allow the transmission of long low mean power signals that can be compressed on reception into a short high power return. The echo returns are processed into I and Q components by the splitter 70 either before or after processing by the analog-to-digital converter 72. The returns are measured at intervals to provide sampled data and conventional MTI/MTD filtering is applied by the digital filter 74. Preferably, the digital filter 74 comprises a digital signal processor (DSP) or conventional high speed microprocessor. The filter applied can be, for example, a Fast Fourier Transform (FFT) or weighted sum. Processing means 76 then applies a predetermined function to the I-Q returns and modifies the function to match the sampled data as a function of velocity in a predetermined fashion. The target radial velocity is determined in dependence upon the modification step of the function.

Having now described various embodiments of the invention, numerous modifications will become apparent to the skilled person. For instance, sampling returns at a regular rate can lead to multiple velocity solutions. It is therefore advantageous to measure the returns at non-equi-spaced intervals to provide unambiguous velocity measurement. This is further aided by the alteration of transmission frequency between bursts. It is preferable for the or each burst to consist of multiple pulses transmitted at irregular intervals (non-constant pulse repetition interval bursts). Digital Fourier transform techniques previously used for the same purpose of target parameter extraction cannot be used with such in-burst stagger; if filter techniques are required, to reduce processing load for example, then MTI processing is required. The use of internally coherent but mutually incoherent bursts gives an improved measure of target velocity, amplitude, range ambiguity and azimuth.

To improve the processing time, the velocity independent components of the residue may be calculated once, prior to the computation of the residue, rather than each time the residue is computed for the different measurements. Similarly, the data independent components of the residue can be pre-calculated to significantly reduce the processing required to obtain the residue.

While a polynomial in time t is preferred for describing the returns, other analytic forms in orthogonal function space may be used.

There are various methods of finding the minimum residue. These include the computationally intensive method of 'over sampling' in velocity space and choosing the velocity corresponding to the smallest value (as described above). A more computationally efficient method calculates the residues at the 'Nyquist' frequency (the cut-off frequency above which a signal must be sampled in order to be able to reconstruct it) and uses an interpolation technique about the minimum calculated point to determine the actual minimum and corresponding velocity.

Where two or more minimum residues are found to be of similar value additional processes can be used. This processing may either flag that there is a potential problem with the extracted parameters (including velocity) or pass the parameters and velocities for all the relevant minima to subsequent radar processing (track extraction). This approach minimises the errors due to velocity ambiguities and multiple targets in the same range cell on the extracted velocity.

The invention claimed is:

1. A method of extracting a radial velocity characteristic of a target from one or more coherent radiation pulse bursts comprising the steps of:
   (a) receiving radiation echo returns of the pulse bursts from a remote scene;
   (b) processing the received echo returns into in-phase (I) and quadrature (Q) components;
   (c) measuring the I and Q components at intervals to provide sampled data;
   (d) modelling the sampled data by applying a predetermined function comprising a helix;
   (e) modifying the predetermined function based on phase and amplitude to optimize the fit to the sampled data as a function of velocity;
   (f) determining the target radial velocity in relation to the pitch of the helix, and
   (g) outputting the determined target radial velocity.

2. A method as claimed in claim 1 wherein step (e) comprises optimising the fit of the predetermined function to the sampled data in a least squares fashion.

3. A method as claimed in claim 1 wherein a model of clutter return is provided for use in steps (d) and (e).

4. A method as claimed in claim 3 wherein the model of clutter return is a low order polynomial function in I and Q.

5. A method as claimed in claim 1 further comprising the step of extracting target amplitude from the sampled data in dependence upon said modified predetermined function.

6. A method as claimed in claim 1 further comprising the step of extracting range ambiguity from the sampled data in dependence upon said modified predetermined function.

7. A method as claimed in claim 1 further comprising the step of extracting target azimuth from the sampled data in dependence upon said modified predetermined function.

8. A method as claimed in claim 1 wherein the echo returns are measured at non-equi-spaced intervals.

9. A method as claimed in claim 1 wherein the pulse bursts are transmitted at a frequency which is changed between successive pulses.

10. A method as claimed in claim 9 wherein each pulse burst consists of multiple pulses transmitted at non-constant pulse repetition interval bursts.

11. A method as claimed in claim 9 wherein the pulse bursts are internally coherent and mutually incoherent.

12. A method as claimed in claim 1 further comprising the step of carrying out conventional Moving Target Indication/Moving Target Detection filtering and target detection before applying a predetermined function, as in step (d), to the I-Q returns.

13. A method as claimed in claim 1 further comprising the step of extracting target amplitude from the sampled data, the target amplitude being extracted in relation to a radius of the helix.

14. A method according to claim 1 comprising the use of a plurality of coherent radiation pulse bursts, the method further comprising the step of estimating target range ambiguity by modifying the predetermined function based on an assumption that one or more initial echo returns do not lie on the helix.

15. A method according to claim 14 further comprising the step of extracting an ambiguity order based on the number of first received pulse signals lying on the axis of the helix.

16. A method according to claim 1 wherein said remote scene comprises a target together with clutter and the sampled data relates to the sample and clutter.

* * * * *